Figure 1:
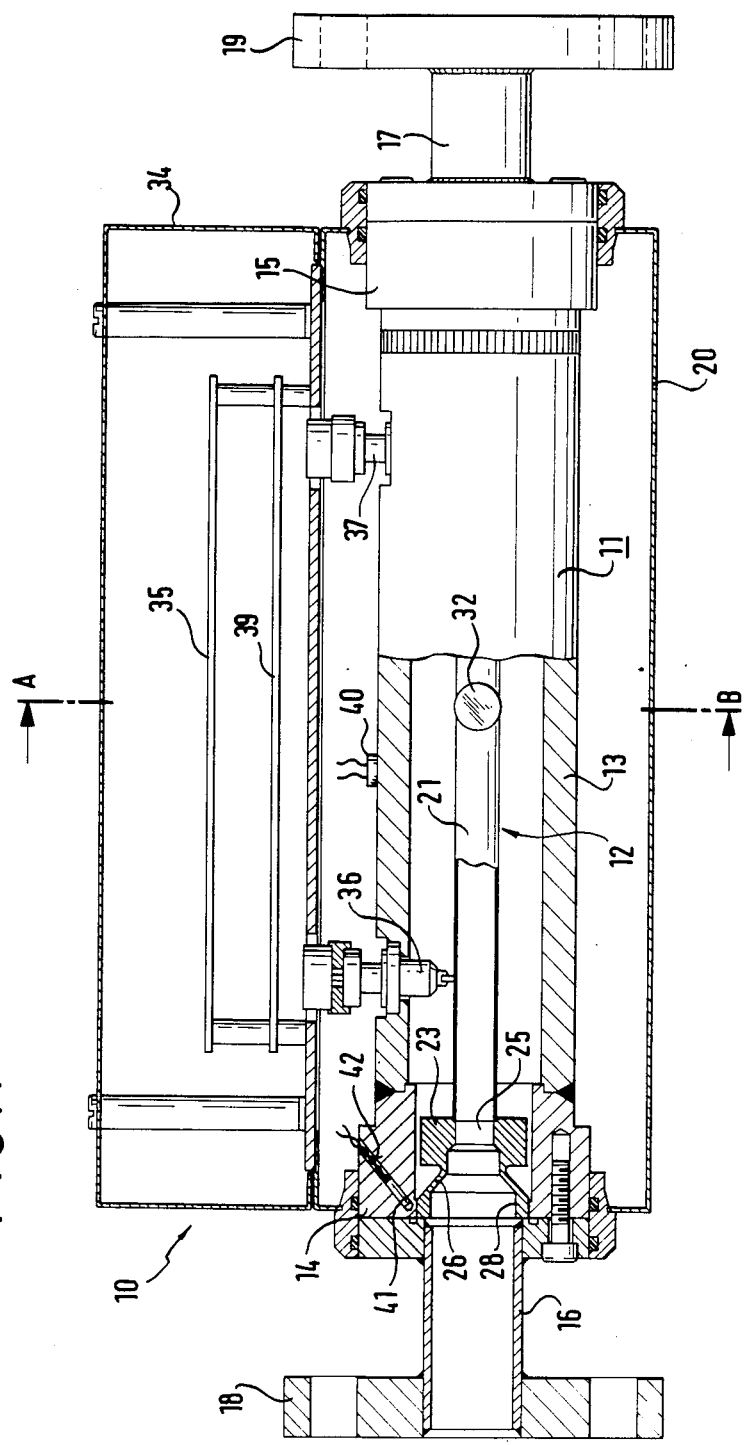

United States Patent [19]

Flecken et al.

[11] Patent Number: 4,768,384
[45] Date of Patent: Sep. 6, 1988

[54] MASS FLOW METER OPERATING BY THE CORIOLIS PRINCIPLE

[75] Inventors: Peter Flecken, Weil-Haltingen, Fed. Rep. of Germany; Niels Abildgaard, Logstor, Denmark

[73] Assignee: Flowtec AG, Switzerland

[21] Appl. No.: 99,558

[22] Filed: Sep. 22, 1987

[30] Foreign Application Priority Data

Sep. 26, 1986 [DE] Fed. Rep. of Germany ....... 3632800

[51] Int. Cl.$^4$ .............................................. G01F 1/84
[52] U.S. Cl. ................................ 73/861.02; 73/861.38
[58] Field of Search ........... 73/861.02, 861.03, 861.37, 73/861.38, 32 A

[56] References Cited

U.S. PATENT DOCUMENTS

| | | | |
|---|---|---|---|
| 4,490,009 | 1/1985 | Ruesch | 73/32 A |
| 4,680,974 | 7/1987 | Simonsen et al. | 73/861.38 |
| 4,711,132 | 12/1987 | Dahlin | 73/861.38 |

*Primary Examiner*—Herbert Goldstein
*Attorney, Agent, or Firm*—Barnes & Thornburg

[57] ABSTRACT

A mass flow meter operating by the Coriolis principle comprises a mechanical oscillating system having two straight measuring tubes which are clamped at both ends. The mechanical oscillating system is arranged axially in a support tube. In the center of the measuring tubes an oscillation exciter is disposed which sets the two measuring tubes into oppositely phased flexural oscillations. Oscillation sensors sensing the mechanical oscillations at equal distances on both sides of the oscillation exciter generate electrical oscillation sensor signals which are characteristic of the frequency and phase position of the sensed oscillations. An evaluation circuit receives the oscillation sensor signals and generates from their phase difference a measuring signal indicating the measured value of the mass flow. A first temperature sensor is arranged such that it measures the temperature of the support tube and generates a first temperature sensor signal indicating said temperature. A second temperature sensor is so arranged that it measures the temperature of the mechanical oscillating system and generates a second temperature sensor signal indicating said temperature. A correction circuit receives the two temperature sensor signals and imparts to the measuring signal on the basis of the temperatures measured a correction for eliminating the temperature influence on the measurement result.

3 Claims, 3 Drawing Sheets

MASS FLOW METER OPERATING BY THE CORIOLIS PRINCIPLE

The invention relates to a mass flow meter operating by the Coriolis principle and comprising a support tube, a mechanical oscillating system disposed axially in the support tube and comprising at least one straight measuring tube clamped at both ends, an oscillation exciter which sets the or each measuring tube in the centre in flexural oscillations, oscillation sensors which sense the mechanical oscillations at equal distance on both sides of the oscillation exciter and generate electrical oscillation sensor signals which are characteristic of the frequency and phase position of the sensed oscillations, and an evaluation circuit which receives the oscillation sensor signals and from the phase difference thereof generates a measuring signal indicating the measured value of the mass flow.

In mass flow measuring devices of this type operating by the Coriolis principle the mass flow measurement is of course based on the fact that the measured medium flowing through the oscillating straight measuring tubes generates Coriolis forces which result in a mutual phase displacement of the mechanical oscillations at the two ends of each measuring tube. The magnitude of this phase displacement is a measure of the mass flow. The phase displacement is measured with the aid of the two oscillation sensors which convert the oscillations sensed by them to electrical sensor signals which are characteristic of the phase position of the oscillations. Proceeding from the phase difference between the oscillation sensor and signals the evaluation circuit can generate a measuring signal which indicates the measured value of the mass flow.

In such mass flow meters the flow value indicated by the measuring signal may contain temperature-induced errors. The causes of such temperature-induced errors are in particular a temperature gradient between support tube and oscillating system, dynamic temperature changes and different thermal coefficients of expansion of the materials of which the support tube and oscillating system consist.

The problem underlying the invention is the provision of a mass flow meter of the type mentioned at the beginning in which temperature-induced errors in the measuring signal are largely compensated.

According to the invention this problem is solved in that a first temperature sensor is so arranged that it measures the temperature of the support tube and generates a first temperature sensor signal indicating said temperature, that a second temperature sensor is so arranged that it measures the temperature of the mechanical oscillating system and generates a second temperature sensor signal indicating said temperature, and that a correction circuit receives the two temperature sensor signals and imparts to the measuring signal on the basis of said temperature sensor signals a correction for eliminating the temperature influence on the measurement result.

By the separate detection of two temperatures, that is the temperature of the support tube and the temperature of the oscillating system, in a mass flow meter with measuring tubes clamped at the ends in a support tube it is possible in simple manner to obtain a correction of the measuring signal by which temperature-induced errors are very extensively compensated. The mass flow meter constructed according to the invention therefore permits an exact measurement of the mass flow in a wide range of the ambient temperature and of measured media of very different and even fluctuating temperatures.

Advantageous further developments and embodiments of the invention are characterized in the subsidiary claims.

Figure 2:
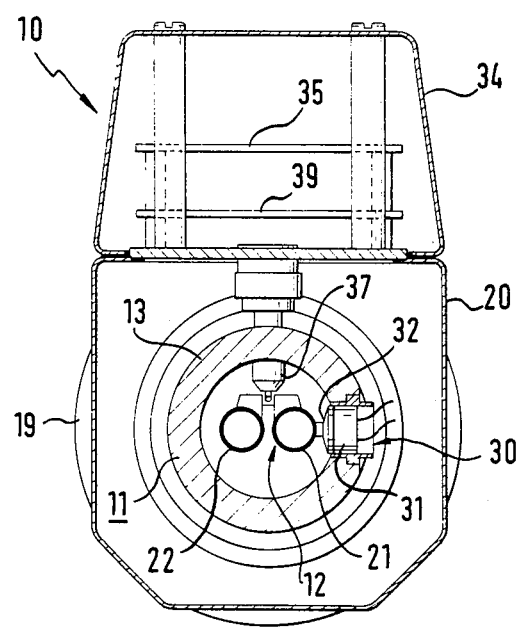
Figure 3:
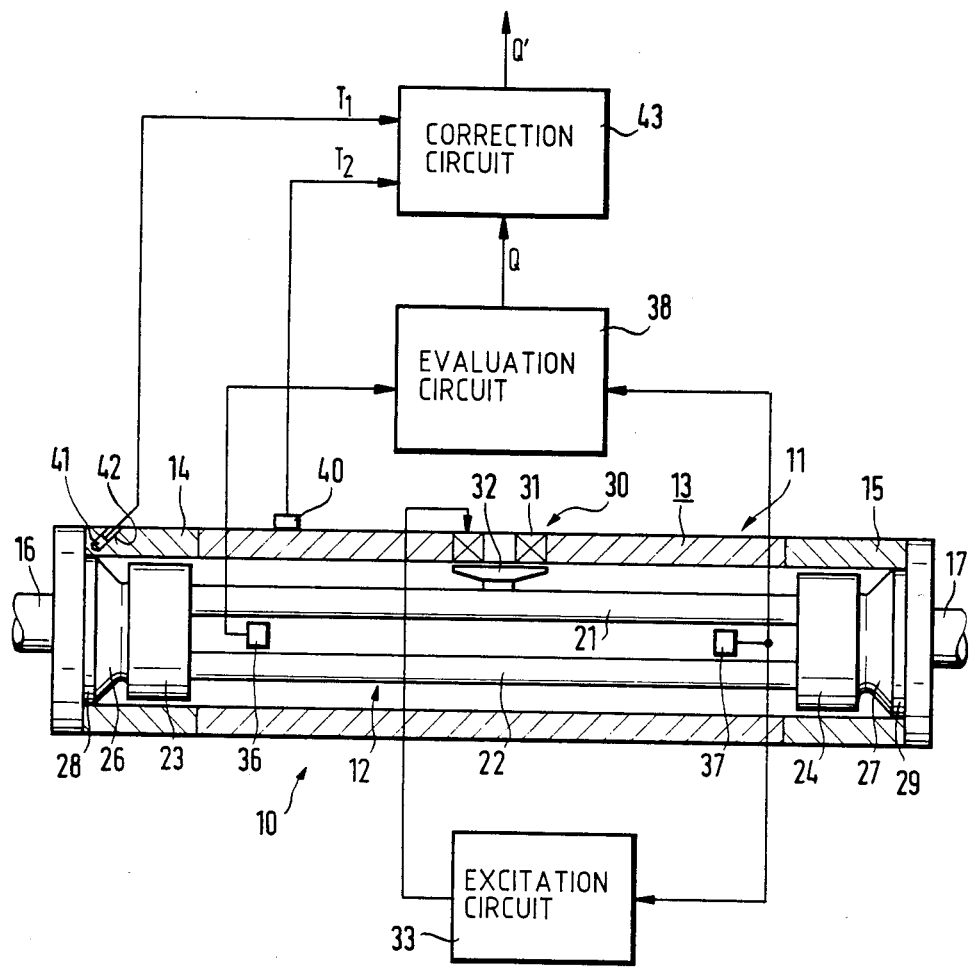

Further features and advantages of the invention will be apparent from the following description of examples of embodiment which are illustrated in the drawings, wherein:

FIG. 1 is a partially sectioned side view of a mass flow meter according to the invention operating by the Coriolis principle, FIG. 2 is a cross-sectional view of the mass flow meter of FIG. 1 along the section line A-B and FIG. 3 is a schematic illustration of the mass flow meter with the block circuit diagram of the connected electronic circuits.

The mass flow meter 10 illustrated in FIG. 1 in a partially sectioned side view and in FIG. 2 in cross-section comprises a strong support tube 11 in the interior of which a mechanical oscillating system 12 is disposed. The support tube 11 consists of a tube portion 13 which is welded at each end to an end bush 14 and 15, respectively. Screwed to each end bush is a connecting piece 16 and 17 respectively carrying a flange 18 and 19 respectively. By means of the flanges 18 and 19 the mass flow meter can be inserted into a conduit through which the medium whose mass flow is to be measured flows. The support tube 11 is surrounded by a sheet metal housing 20.

The mechanical oscillating system 12 consists of two parallel measuring tubes 21 and 22 which at the two ends are connected by distributor members 23 and 24 together in such a manner that they are connected in parallel from the fluid mechanics point of view. The measuring tubes 21 and 22 extend over the entire length of the tube portion 13 and the distributing members lie in the interior of the end bushes 14 and 15. The two distributing members 23 and 24, illustrated schematically in FIG. 3, are made and arranged completely identically but in the partial sectional view of FIG. 1 only the distributing member 23 lying in the interior of the end bush 14 can be seen. However, the following description of the distributing member 23 applies identically also to the distributing member 24 arranged at the other end of the oscillating system.

The distributing member 23 contains in the interior flow passages 25 which divide the flow coming through the connecting piece 16 uniformly amongst the two measuring tubes 21 and 22. In corresponding manner the distributing member 24 arranged at the other end combines the flow from the two measuring tubes so that the combined flow flows off through the connecting piece 17. Of course, the flow direction may also be the converse.

The distributing member 23 is connected to the inner edge of an annular conically shaped diaphragm 26. The outer edge of the diaphragm 26 is connected to a holder ring 28 which is clamped in the end bush 14 and bears axially against the somewhat inwardly projecting end face of the connecting piece 16. Preferably, the diaphragm 26 and holder ring 28 are made in one piece with the distributing member 23. In the same manner on the distributing member 24 (FIG. 3) an annular conical diaphragm 27 is integrally formed which merges into a holder ring 29. Thus, the oscillating system 12 is suspended by means of the diaphragms 26 and 27 axially in the support tube 11, the sole contact between the oscillating system 12 and the support tube 11 being via the diaphragms 26 and 27 disposed at the two ends.

Arranged in the centre of the support tube 11 is an oscillation exciter 30 (FIG. 2) which can set the two measuring tubes 21, 22 into oppositely directed flexural oscillations, the oscillation plane of which lies in the common plane of the two measuring tubes, i.e. perpendicularly to the plane of the drawing in FIG. 1. The oscillation exciter 30 consists of an electromagnet 31 which is secured in the wall of the tube portion 13 and opposite which an armature 32 lies which is secured to the measuring tube 21. When an alternating current is sent through the coil of the electromagnet 31 by the alternating attraction forces between the electromagnet 31 and the armature 32 the measuring tube 21 is set in flexural oscillations which via the distributing members 23 and 24 are coupled over to the measuring tube 22 so that finally the two measuring tubes 21 and 22 perform opposite phase flexural oscillations. The excitation alternating current comes from an electronic excitation circuit 33 which is accommodated in a circuit housing 34 secured to the sheet metal housing 20, as indicated in FIGS. 1 and 2 by the printed circuit board 35.

The measurement of the mass flow is based in such a mass flow meter on the fact that the measured medium flowing through the oscillating measuring tubes 21 and 22 generates Coriolis forces which result in a mutual phase displacement of the mechanical oscillations at the two ends of each measuring tube. The magnitude of said phase displacement is a measure of the mass flow. For measuring the phase displacement on both sides of the oscillation exciter 30 at equal distances from the latter two oscillation sensors 36 and 37 are disposed. The oscillation sensors 36 and 37 sense the mechanical oscillations of the measuring tubes 21 and 22 and convert them to electrical sensor signals which are characteristic of the phase position of the sensed oscillations. The oscillation sensor signals are supplied to an electronic evaluation circuit 38 (FIG. 3) which is also accommodated in the circuit housing 34 as indicated in FIGS. 1 and 2 by the printed circuit board 39.

The output signal of the oscillation sensor 37 is also supplied to the excitation circuit 33 (FIG. 3) which furnishes at its output to the electromagnet 31 of the oscillation exciter 30 an alternating current which has the same frequency as the output signal of the oscillation sensor 37 and a phase position such that the measuring tubes 21 and 22 are stimulated to execute flexural oscillations with their natural resonance frequency.

The evaluation circuit 38 (FIG. 3) determines the phase difference between the two oscillation sensor signals and emits at its output a measuring signal which represents the measured value Q of the mass flow expressed by said phase difference. Said measured value Q may however contain errors due to temperature-induced influences on the oscillation behaviour of the mechanical oscillating system 12.

Such temperature-induced influences may have different causes which can occur on their own or in conjunction with each other. Even if the support tube 11 and the oscillating system 12 have the same temperature temperature-induced mechanical stresses can occur if the support tube and oscillating system consist of different materials with different coefficients of thermal expansion. Temperature influences have an even greater effect on the measurement result if the temperature of the measuring tubes is different from the temperature of the support tube. This is the case in particular when the mass flow is to be measured of a medium whose temperature is different from the ambient temperature. With very hot or very cold measured media a very great temperature gradient can exist between the support tube and the measuring tubes. Finally, dynamic temperature changes must also be taken into account when the temperature of the measured medium and/or the ambient temperature are not constant.

The mass flow meter described is equipped with additional means permitting compensation of such temperature-induced influences on the measurement result. These means include a first temperature sensor 40 which is arranged so that it measures the temperature of the support tube 11 and furnishes a first electrical temperature sensor signal indicating said temperature. The temperature sensor 40 may be arranged for this purpose at the outside of the tube portion 13 spaced from the two end bushes 14 and 15 of the support tube 11.

A second temperature sensor 41 is so arranged that it measures the temperature of the mechanical oscillating system 12 and furnishes a second electrical temperature signal indicating said temperature. The second temperature sensor could be arranged for this purpose on a part of the mechanical oscillating system 12 within the support tube but would then be permanently subjected to the mechanical oscillations, resulting in problems as regards the fatigue strength. Therefore, in the example illustrated the second temperature sensor 41 is also disposed on the support tube 11 but at a point which is substantially at the temperature of the measured medium, which is also the temperature of the oscillating system 12. For this purpose in the end bush 14 a recess 42 is formed which extends from the outer surface of the end bush 14 inclined up to the immediate vicinity of the holder ring 28. The temperature sensor 41 is disposed at the end of the recess 42 as close as possible to the holder ring 28 and its connection leads are led outwardly through the recess 42. Since the holder ring 28 is at the temperature of the measured medium the temperature sensor 41 substantially measures the temperature of the mechanical oscillating system 12. Depending on the form of the temperature sensor 41 the recess 42 can be an inclined bore or a milled-in inclined slit.

The temperature sensor 40 and 41 may be of any desired known type. Preferably, temperature-dependent resistors of metal or semiconductor material are used.

The temperature sensor signals furnished by the two temperature sensors 40 and 41 are supplied to a correction circuit 43 (FIG. 3) which is also accommodated in the circuit housing 34, for example together with the evaluation circuit 38 on the printed circuit board 39. The correction circuit 43 also receives the output signal of the evaluation circuit 38 representing the uncorrected measured value Q of the mass flow and furnishes at the output a measuring signal representing the corrected measured value Q' of the mass flow. For this purpose the correction circuit multiplies the uncorrected measured value by a correction factor K which depends on the two temperatures which are measured by means of the temperature sensors 40 and 41:

$$Q' = K \cdot Q \tag{1}$$

For the flow meter described with an oscillating system firmly clamped at the ends and consisting of straight measuring tubes the following correction factor applies $$k = K_0 + k_1 T_1 + k_2 T_2 + k_3 T_1^2 + k_4 T_2^2 + k_5 T_1 T_2 \quad (2)$$

Wherein:
$T_1$: measuring tube temperature
$T_2$: support tube temperature
$k_0, k_1$: constant coefficients which are specific to a given embodiment of the mass flow meter.

It has been found in practice that the terms of higher order are negligible. A temperature compensation of adequate accuracy is obtained if the uncorrected measured value Q is multiplied by the correction factor $$K = k_0 + k_l T_l + k_2 T_2 \quad (3)$$

The coefficients $k_0$, $k_l$ and $k_2$ are determined empirically for a specific embodiment of the mass flow meter. The expert will then have no difficulty in designing a correction circuit which on the basis of the two temperature sensor signals modifies the measuring signal in such a manner that the uncorrected measured value Q is multiplied by the above correction factor K. If for example the output signal of the evaluation circuit 38 is an analog signal proportional to the measured value Q the correction circuit 43 may contain an amplifier whose gain is controlled proportionally to the correction factor K.

In most cases however the evaluation circuit 38 is a microcomputer which is so programmed that it determines the measured value Q from the phase displacement of the oscillation sensor signals. In this case the correction of the measured value Q is preferably made by an additional correction program in the same microcomputer.

We claim:

1. Mass flow meter operating by the Coriolis principle and comprising a support tube, a mechanical oscillating system disposed axially in the support tube and comprising at least one straight measuring tube clamped at both ends, an oscillation exciter which sets the or each measuring tube in the the centre in flexural oscillations, oscillation sensors which sense the mechanical oscillations at equal distance on both sides of the oscillation exciter and generate electrical oscillation sensor signals which are characteristic of the frequency and phase position of the sensed oscillations, and an evaluation circuit which receives the oscillation sensor signals and from the phase difference thereof generates a measuring signal indicating the measured value of the mass flow, characterized in that a first temperature sensor is so arranged that it measures the temperature of the support tube and generates a first temperature sensor signal indicating said temperature, that a second temperature sensor is so arranged that it measures the temperature of the mechanical oscillating system and generates a second temperature sensor signal indicating said temperature, and that a correction circuit receives the two temperature sensor signals and imparts to the measuring signal on the basis of the measured temperatures a correction for eliminating the temperature influence on the measurement result.

2. Mass flow meter according to claim 1, characterized in that the correction circuit multiplies the measured value of the mass flow by a correction factor $$K = k_0 + k_1 T_1 + k_2 T_2,$$

wherein $T_l$ is the temperature of the oscillating system, $T_2$ the temperature of the support tube and $k_0$, $k_l$, $k_2$ are constant coefficients specific to the mass flow meter.

3. Mass flow meter according to claim 1, characterized in that the evaluation circuit and the correction circuit are formed by a correspondingly programmed micro- computer.

* * * * *